United States Patent [19]

Okada et al.

[11] Patent Number: 5,132,794
[45] Date of Patent: Jul. 21, 1992

[54] HORIZONTAL SYNCHRONIZING SIGNAL SEPARATION CIRCUIT FOR A DISPLAY APPARATUS

[75] Inventors: Hisao Okada, Ikoma; Kuniaki Tanaka, Nara, both of Japan

[73] Assignee: Sharp Kabushiki Kaisha, Japan

[21] Appl. No.: 712,873

[22] Filed: Jun. 11, 1991

[30] Foreign Application Priority Data

Jun. 13, 1990 [JP] Japan .................. 2-156522

[51] Int. Cl.$^5$ .............................. H04N 5/08
[52] U.S. Cl. ........................ 358/153; 358/154
[58] Field of Search .................. 358/153, 154

[56] References Cited

U.S. PATENT DOCUMENTS 4,675,734 6/1987 Widem .................. 358/153

FOREIGN PATENT DOCUMENTS

0131173 8/1982 Japan .................. 358/154
0097780 5/1985 Japan .................. 358/154
1-41522 2/1989 Japan .
1-41575 2/1989 Japan .

Primary Examiner—Howard W. Britton
Assistant Examiner—Minsun Oh
Attorney, Agent, or Firm—Nixon & Vanderhye

[57] ABSTRACT

The horizontal synchronizing signal separation circuit extracts pulses indicative of horizontal synchronizing timing from a composite synchronizing signal which includes a horizontal synchronizing signal and a vertical synchronizing signal. When detecting the rising edge of the composite synchronizing signal, a rising edge detection circuit generates a pulse signal. A counter counts the number of the pulses in a clock signal. The output of the counter is supplied to a decoder which decodes the output of the counter and outputs timing signals. Using the timing signals, a control signal is generated to control a gate to which the output of the rising edge detection circuit is supplied. The output of the gate is used for generating a separated horizontal synchronizing signal.

6 Claims, 12 Drawing Sheets

HORIZONTAL SYNCHRONIZING SIGNAL SEPARATION CIRCUIT FOR A DISPLAY APPARATUS

BACKGROUND OF THE INVENTION

1. Field of the Invention

This invention relates to a horizontal synchronizing signal separation circuit for a display apparatus such as a liquid crystal display (LCD) apparatus. More particularly, this invention relates to a horizontal synchronizing signal separation circuit which can extract pulses indicative of horizontal synchronizing timing from a composite synchronizing signal which includes a horizontal synchronizing signal and a vertical synchronizing signal.

2. Description of the Prior Art

In a television system such as the NTSC (National Television System Committee) system or PAL (Phase Alternation Line) system, only a composite synchronizing signal which includes vertical and horizontal synchronizing signals is supplied as a synchronizing signal to a television apparatus.

Figure 12:
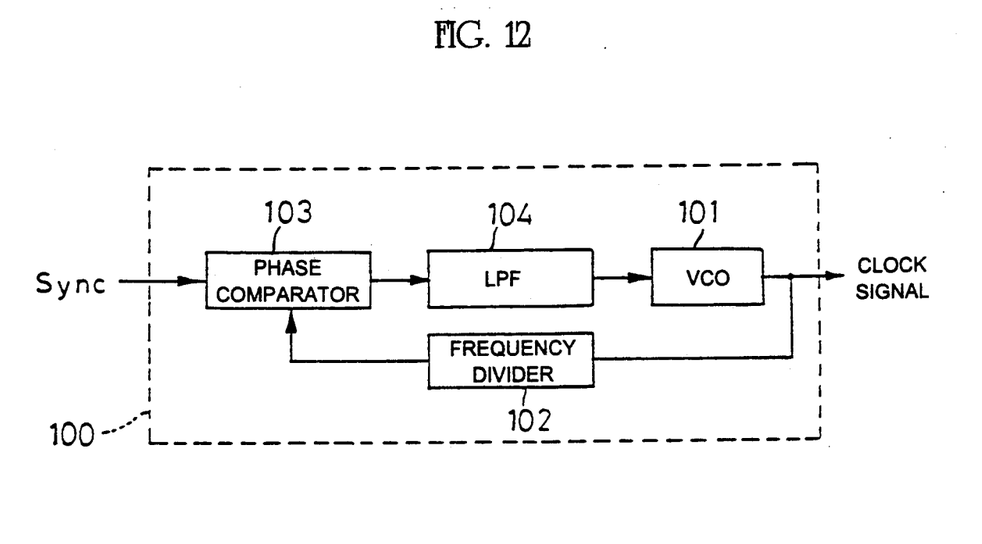
FIG. 12 is a block diagram showing a PLL circuit used for generating a sampling clock signal in an LCD apparatus.

In a matrix type LCD apparatus which has been widely used in recent years, image information must be sampled once, so a clock signal for the sampling is generated. When a display is performed based on the image information using the above-mentioned television system, the clock signal is required to be accurately synchronized with a horizontal synchronizing signal. FIG. 12 shows a PLL (Phase-Locked Loop) circuit 100 for generating the clock signal. The PLL circuit 100 has a loop which comprises a voltage controlled oscillator (VCO) 101, a frequency divider 102, a phase comparator 103 and a low-pass filter (LPF) 104. It is desirable that a synchronizing signal Sync input into the PLL circuit 100 consists of a horizontal synchronizing signal only. Practically, however, the above-mentioned composite synchronizing signal is supplied to the PLL circuit 100 without being separated, as the synchronizing signal Sync.

Figure 13A:
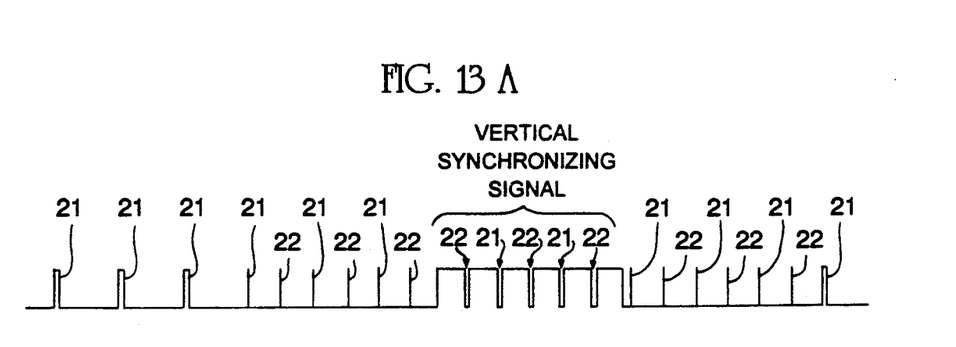
FIGS. 13A to 13C show composite synchronizing signals used in the NTSC system.
Figure 13B:
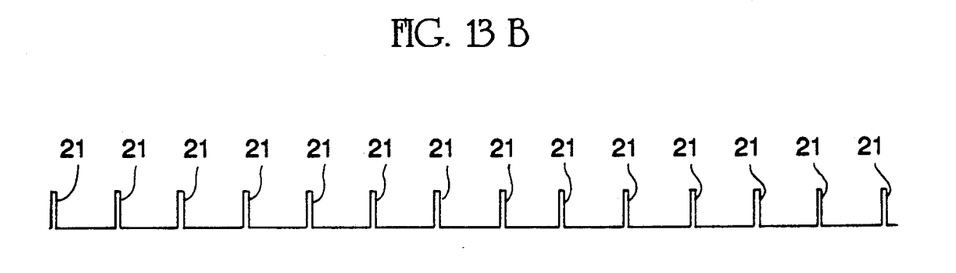
Figure 13C:
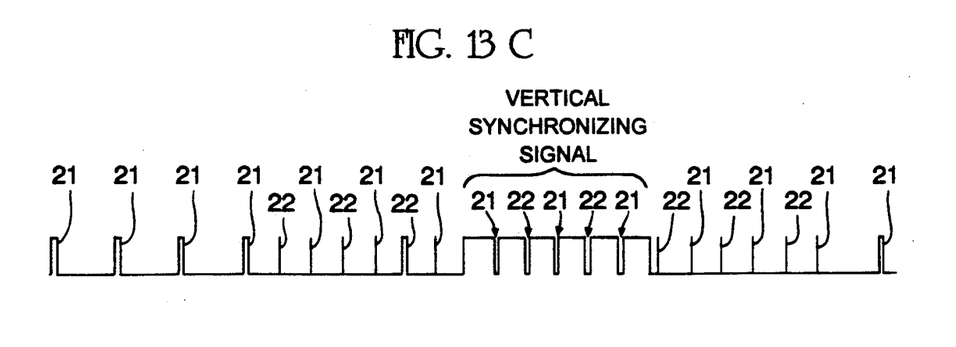

FIGS. 13A to 13C show composite synchronizing signals used in the NTSC system. FIG. 13A shows a composite synchronizing signal in a transition from an even field to an odd field. FIG. 13B shows part of a composite synchronizing signal in one field. In FIG. 13C, a composite synchronizing signal in a transition from an odd field to an even field is shown. As shown in FIGS. 13A to 13C, in a transition from a certain field to the next field, a composite synchronizing signal includes vertical synchronizing pulses and equalizing pulses 22 as well as horizontal synchronizing pulses 21. The equalizing pulses 22 are inserted so that the waveforms of the composite synchronizing signal in the portion of the vertical synchronizing signal and in the peripheral portion thereof are equalized during the transition from the even field to the odd field and during the transition from the odd field to the even field. In the peripheral portion of the vertical synchronizing signal, the width of each of the horizontal synchronizing pulse 21 and equalizing pulse 22 is half as compared with that of the usual horizontal synchronizing pulse 21.

In the prior art, since such a composite synchronizing signal is input into the PLL circuit 100 (FIG. 12) without being separated, the phase relationship in the PLL circuit 100 is disturbed due to the presence of the vertical synchronizing pulses and equalizing pulses in the composite synchronizing signal shown in FIGS. 13A and 13C. This disturbance causes the oscillation frequency of the VCO 101 to fluctuate. If the fluctuation in the oscillation frequency of the VCO 101 is not absorbed even when entering a display period during which image information for the display area is supplied to the LCD apparatus, a serious problem arise in that the resulting image is distorted.

In order to prevent the image distortion from occurring, the fluctuation in the oscillation frequency of the VCO 101 must be absorbed during a period prior to the display period (i.e., a vertical retrace line interval). This mainly makes it difficult to design a PLL circuit for a matrix type display apparatus such as an LCD apparatus. Especially in a specific reproduction of a video tape such as a rapid reproduction, the waveform of the composite synchronizing signal largely differs from its usual waveform. In such an occasion, therefore, it is very difficult to cope with such a composite synchronizing signal.

Figure 14:
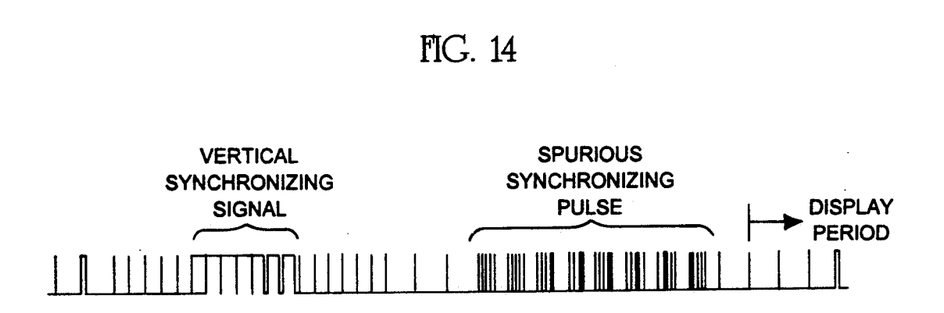
FIG. 14 shows a composite synchronizing signal obtained from a video tape which was subjected to a duplication prevention process.

In some prerecorded video tapes which are commercially available, an AGC (Auto Gain Control) signal for video recording is intentionally inserted into a composite video signal for the purpose of unstable reproduction of a duplicated video tape of the prerecorded video tape. When the duplicated video tape is reproduced and composite synchronizing signals are to be extracted from the composite video signal, the AGC signal cannot be completely removed by a low-pass filter. Therefore, pulses such as a spurious synchronizing signal mixedly appear immediately after the vertical synchronizing signal in the composite synchronizing signal, as shown in FIG. 14. If the composite synchronizing signal which includes the spurious synchronizing signal immediately before the display period as shown in FIG. 14 is to be input, the PLL circuit 100 is disturbed by this spurious synchronizing signal, resulting in that it cannot be practically stabilized before the display period. In the prior art, although the image area on the screen to be displayed is made smaller for solving the problem, it is difficult to completely cover up the image distortion appearing in the upper portion on the display screen, and in many cases, good display cannot be attained.

SUMMARY OF THE INVENTION

The horizontal synchronizing signal separation circuit of this invention, which overcomes the above-discussed and numerous other disadvantages and deficiencies of the prior art, comprises detection means for receiving a composite synchronizing signal which includes a horizontal synchronizing signal and a vertical synchronizing signal, and for generating a detection signal through an output, said detection signal being indicative of detecting a rising edge of said composite synchronizing signal; gate means, coupled to said output of said detection means, for receiving a control signal, and for passing said detection signal in accordance with said control signal; count means, coupled to said output of said detection means, for receiving a clock signal, and for counting the number of pulses in said received clock signal, the contents of said count means being cleared by said detection signal having passed through said gate means; control signal generation means, coupled to the output of said count means, for generating said control signal in accordance with said output of said count means; and means, coupled to said output of said detection means, for generating a pulse which rises substantially at the timing when said detection signal passes through said gate means.

In a preferred embodiment, said circuit may further comprise another detection means for receiving said composite synchronizing signal, and for generating another detection signal indicative of detecting a falling edge of said composite synchronizing signal.

In another aspect of the invention, the horizontal synchronizing signal separation circuit comprises: detection means for receiving a composite synchronizing signal which includes a horizontal synchronizing signal and a vertical synchronizing signal, and for generating a detection signal through an output, said detection signal being indicative of detecting a rising edge of said composite synchronizing signal; gate means, coupled to said output of said detection means, for receiving a control signal, and for passing said detection signal in accordance with said control signal; count means, coupled to said output of said detection means, for receiving a clock signal, and for counting the number of pulses in said received clock signal, the contents of said count means being cleared by said detection signal having passed through said gate means; control signal generation means, coupled to the output of said count means and the output of said gate means, for generating said control signal in accordance with said output of said count means and said output of said gate means; and means, coupled to said output of said detection means, for generating a pulse which rises substantially at the timing when said detection signal passes through said gate means.

In a further aspect of the invention, the horizontal synchronizing signal separation circuit comprises: first detection means for receiving a composite synchronizing signal which includes a horizontal synchronizing signal and a vertical synchronizing signal, and for generating a first detection signal through an output, said first detection signal being indicative of detecting a rising edge of said composite synchronizing signal; second detection means for receiving said composite synchronizing signal, and for generating a second detection signal through an output, said second detection signal being indicative of detecting a rising edge of said composite synchronizing signal; first gate means, coupled to said output of said first detection means, for receiving a control signal, and for passing said first detection signal in accordance with said control signal; second gate means, coupled to said output of said second detection means, for receiving said control signal, and for passing said second detection signal in accordance with said control signal; count means for receiving a clock signal, and for counting the number of pulses in said received clock signal, the contents of said count means being cleared by said second detection signal having passed through said second gate means; control signal generation means, coupled to the output of said count means, for generating said control signal in accordance with said output of said count means; and means, coupled to said output of said first detection means, for generating a pulse which rises substantially at the timing when said first detection signal passes through said gate means.

Preferably, said second detection means may comprise a low-pass filter provided on the input side of said second detection means.

Alternatively, said circuit may further comprise a third detection means for receiving said composite synchronizing signal, and for generating a third detection signal indicative of detecting a falling edge of said composite synchronizing signal.

Thus, the invention described herein makes possible the objectives of:

(1) providing a horizontal synchronizing signal separation circuit which can extract pulses indicative of horizontal synchronizing timing from a composite synchronizing signal which includes a horizontal synchronizing signal and a vertical synchronizing signal;

(2) providing a horizontal synchronizing signal separation circuit for a display apparatus by which a sampling clock signal can be stably obtained;

(3) providing a horizontal synchronizing signal separation circuit for a display apparatus by which the image quality of the display apparatus can be greatly improved; and (4) providing a horizontal synchronizing signal separation circuit for a display apparatus in which a PLL circuit can be constructed in a simple manner.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
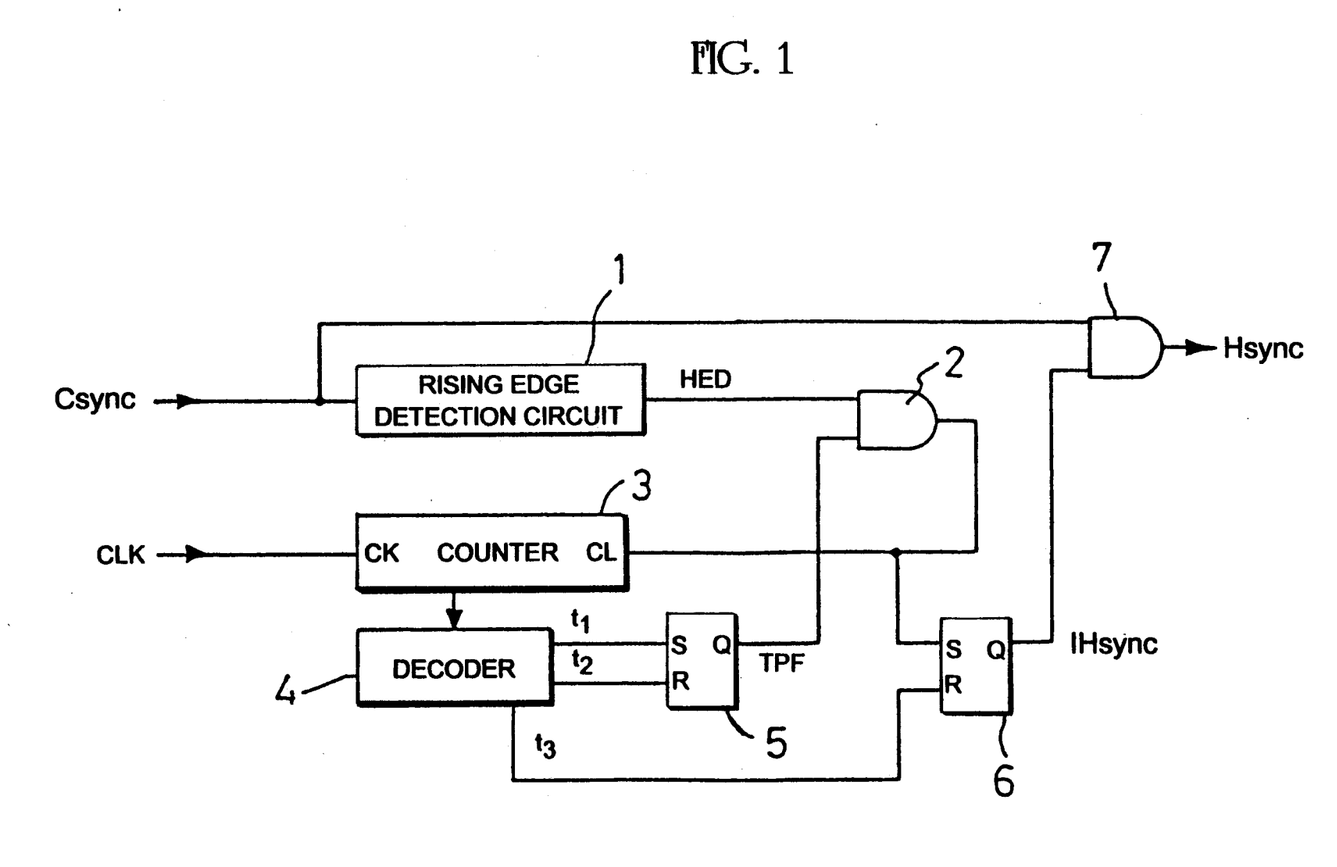
FIG. 1 is a block diagram showing a horizontal synchronizing signal separation circuit in a first embodiment of the invention.

FIG. 1 shows a block diagram of a horizontal synchronizing signal separation circuit according to the invention. A composite synchronizing signal $C_{sync}$ is input into a rising edge detection circuit 1. When detecting the rising edge of the composite synchronizing signal $C_{sync}$, the rising edge detection circuit 1 generates a pulse signal HED which is then supplied to one of the input terminals of an AND gate 2. A counter 3 counts the number of the pulses in a clock signal CLK. The output of the counter 3 is supplied to a decoder 4 which decodes the output of the counter 3 and outputs three timing signals $t_1$, $t_2$ and $t_3$. The timing signals $t_1$ and $t_2$ are input into an RS flip-flop 5 through a set terminal S and a reset terminal R thereof, respectively. A signal TPF output from the RS flip-flop 5 is supplied to the other input terminal of the AND gate 2. When the signal TPF is HIGH, the pulse signal HED passes through the AND gate 2. Namely, the signal TPF is a control signal of the AND gate 2, and is produced by the decoder 4 and RS flip-flop 5 in accordance with the output of the counter 3. The output of the AND gate 2 (i.e, the signal HED which has passed through the AND gate 2) is input to a clear terminal CL of the counter 3. The timing signal $t_3$ is supplied to the reset terminal R of an RS flip-flop 6. The output of the AND gate 2 is fed also into a set terminal S of the RS flip-flop 6. The composite synchronizing signal $C_{sync}$ and a signal $IH_{sync}$ output from the RS flip-flop 6 are input into two input terminals of an AND gate 7, respectively. The AND gate 7 outputs a separated horizontal synchronizing signal $H_{sync}$. The rising edge of the pulse in the separated horizontal synchronizing signal $H_{sync}$ substantially coincides with the timing at which the pulse signal HED passes through the AND gate 2 by the operation of the RS flip-flop 6 and AND gate 7.

The separated horizontal synchronizing signal $H_{sync}$ is input into the PLL circuit 100 as shown in FIG. 12. The clock signal CLK input to the counter 3 may be the output signal of the PLL circuit 100 or a signal produced based on this output signal.

Figure 2:
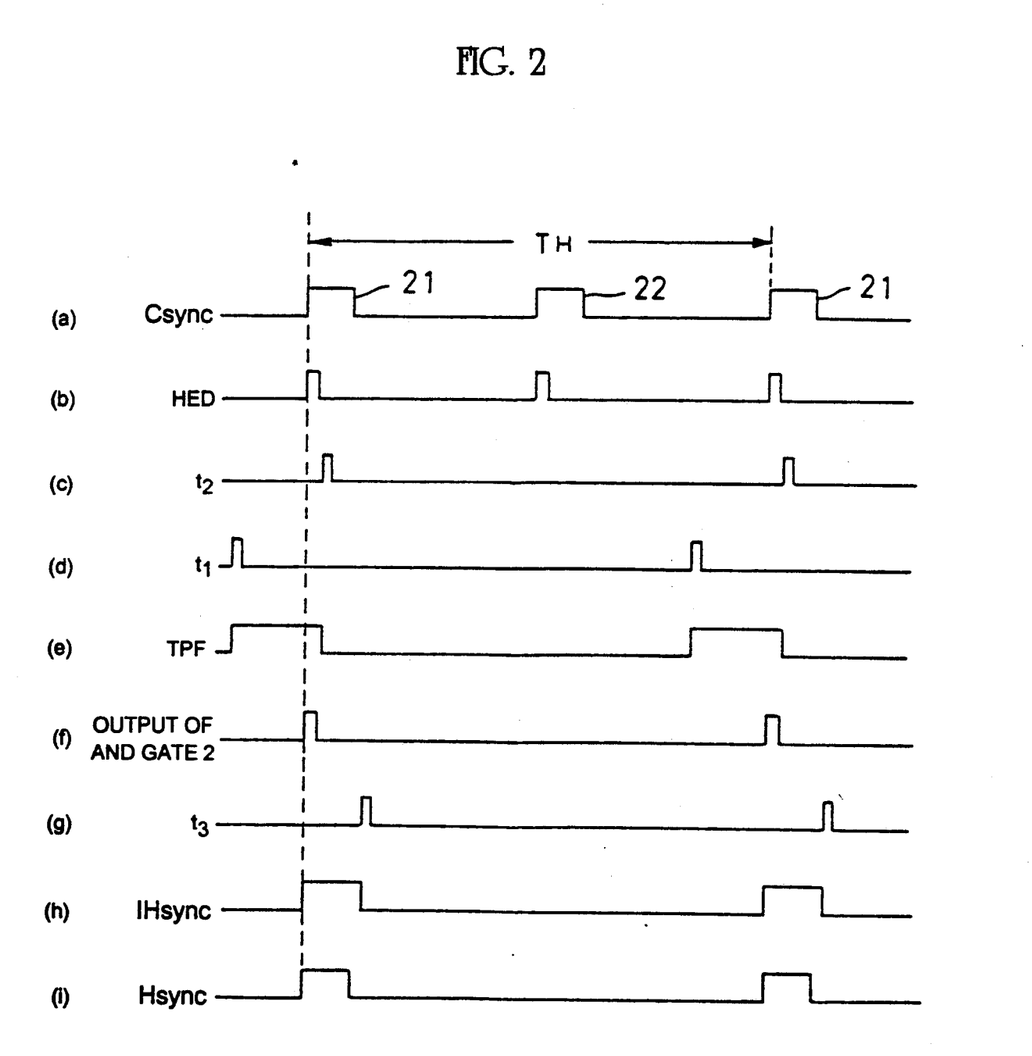
FIGS. 2 to 4 are timing charts illustrating the operation of the separation circuit shown in FIG. 1.

The operation of this embodiment will be described. In the timing chart of FIG. 2, signals at various portions in the horizontal synchronizing signal separation circuit shown in FIG. 1 are illustrated. These signals are obtained when the counter 3 is synchronized with the horizontal synchronizing pulse 21 in the composite synchronizing signal $C_{sync}$. The composite synchronizing signal $C_{sync}$ shown in FIG. 2 includes horizontal synchronizing pulses 21 and equalizing pulses 22. The rising edge detection circuit 1 outputs the pulse signal HED at the rising edge of the composite synchronizing signal $C_{sync}$. The signal TPF output from the RS flip-flop 5 is HIGH during the period from the time when the RS flip-flop 5 is set by the timing signal $t_1$ from the decoder 4, to the time when reset by the timing signal $t_2$ from the decoder 4. The pulse signal HED passes through the AND gate 2 during the HIGH level period of the signal TPF. The signal $IH_{sync}$ output from the RS flip-flop 6 is HIGH during the period from the time when the RS flip-flop 6 is set by the pulse signal HED which has passed through the AND gate 2, to the time when reset by the timing signal $t_3$ from the decoder 4. The AND gate 7 is controlled by the signal $IH_{sync}$ so as to pass the composite synchronizing signal $C_{sync}$ during the HIGH level period of the signal $IH_{sync}$.

The counter 3 is cleared by the pulse signal HED which has passed through the AND gate 2. The decoder 4 is set so as to output the timing signal $t_1$ ((d) of FIG. 2) by which the signal TPF becomes HIGH, at an appropriate timing after the generation of the equalizing pulse 22 during a horizontal scanning period $T_H$ after the counter 3 has been cleared. Accordingly, if the counter 3 is synchronized with the horizontal synchronizing pulse 21, the signal HED corresponding to the equalizing pulse 22 cannot pass through the AND gate 2. The decoder 4 is set so as to output the timing signal $t_2$ ((c) of FIG. 2) by which the signal TPF becomes LOW, at a timing not much later than the falling edge of the signal HED after the count 3 has been cleared. With regard to the generation of the timing signal $t_3$, the decoder 4 is set so that the pulse width of the signal $IH_{sync}$ generated by the RS flip-flop 6 is a little larger than the width of the horizontal synchronizing pulse 21 included in the composite synchronizing signal $C_{sync}$.

The process of synchronizing the counter 3 in the horizontal synchronizing signal separation circuit of FIG. 1 with the horizontal synchronizing pulse 21 in the composite synchronizing signal $C_{sync}$ will be described with reference to FIG. 3 which shows the composite synchronizing signal $C_{sync}$ in a transition from an even field to an odd field. When the power is turned on, the counter 3 starts to count the number of pulses in the clock signal CLK. The first timing at which the decoder 4 generates the timing signal $t_1$ after the start of the count operation of the counter 3 is not fixedly related to the composite synchronizing signal $C_{sync}$. In other words, the first timing signal $t_1$ (in FIG. 3, the timing is represented by T1) can be generated at any timing with respect to the composite synchronizing signal $C_{sync}$. By the first timing signal $t_1$, the signal TPF becomes HIGH. This means that the pulse signal HED which is output as a result of the detection of the rising edge of the composite synchronizing signal $C_{sync}$ can pass through the AND gate 2. The signal HED generated at the timing T2 passes through the AND gate 2 and clears the counter 3. As a result, the counter 3 performs its count operation from the initial state thereof, and the decoder 4 outputs the timing signal $t_2$. By this timing signal $t_2$, the signal TPF becomes LOW. Since, at the next rising edge of the composite synchronizing signal $C_{sync}$ (i.e., at the timing T3), the signal TPF is LOW, the counter 3 is not cleared and continues its count operation. At the timing T4, the timing signal $t_1$ is output, and the signal TPF becomes HIGH again. Accordingly, the counter 3 is cleared by the next pulse signal HED (at the timing T5).

After the timing T5, by the pulse signal HED corresponding to the rising edge of the composite synchronizing signal $C_{sync}$, the counter 3 is cleared at the timings T7, T9 and T11, and is not cleared at the timings T6, T8, T10 and T12. In the example shown in FIG. 3, the timings T7, T9 and T11 are the timings of the equalizing pulse 22, and the timings T6, T8, T10 and T12 are the timings of the horizontal synchronizing pulse 21. The counter 3 is not synchronized with the horizontal synchronizing pulse 21 by the timing T12.

The equalizing pulse 22 does not exist after the timing T12. Therefore, after the counter 3 is cleared by the signal HED at the timing T11, the counter 3 continues its count operation until cleared by the signal HED corresponding to the horizontal synchronizing pulse 21 at the timing T13. Thereafter, the counter 3 is cleared at the timing of the horizontal synchronizing pulse 21. In other words, after the timing T13, the counter 3 is synchronized with the horizontal synchronizing pulse 21.

Figure 3:
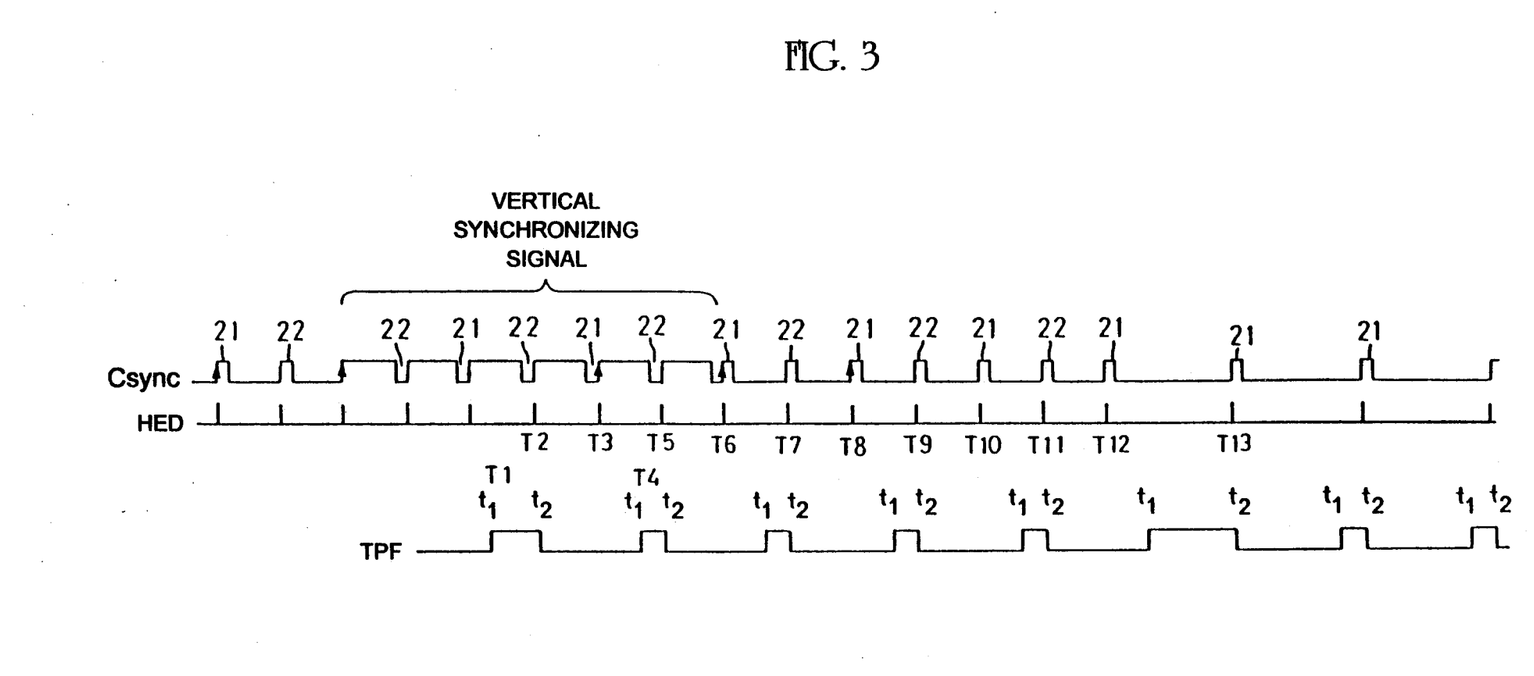

As is apparent from FIG. 3 and the above description, even if the first timing signal $t_1$ is generated at any timing after the power on operation, the counter 3 will be synchronized with the horizontal synchronizing pulse 21 by the time entering the portion in which the composite synchronizing signal $C_{sync}$ does not include the equalizing pulse 22, at the latest.

Figure 4:
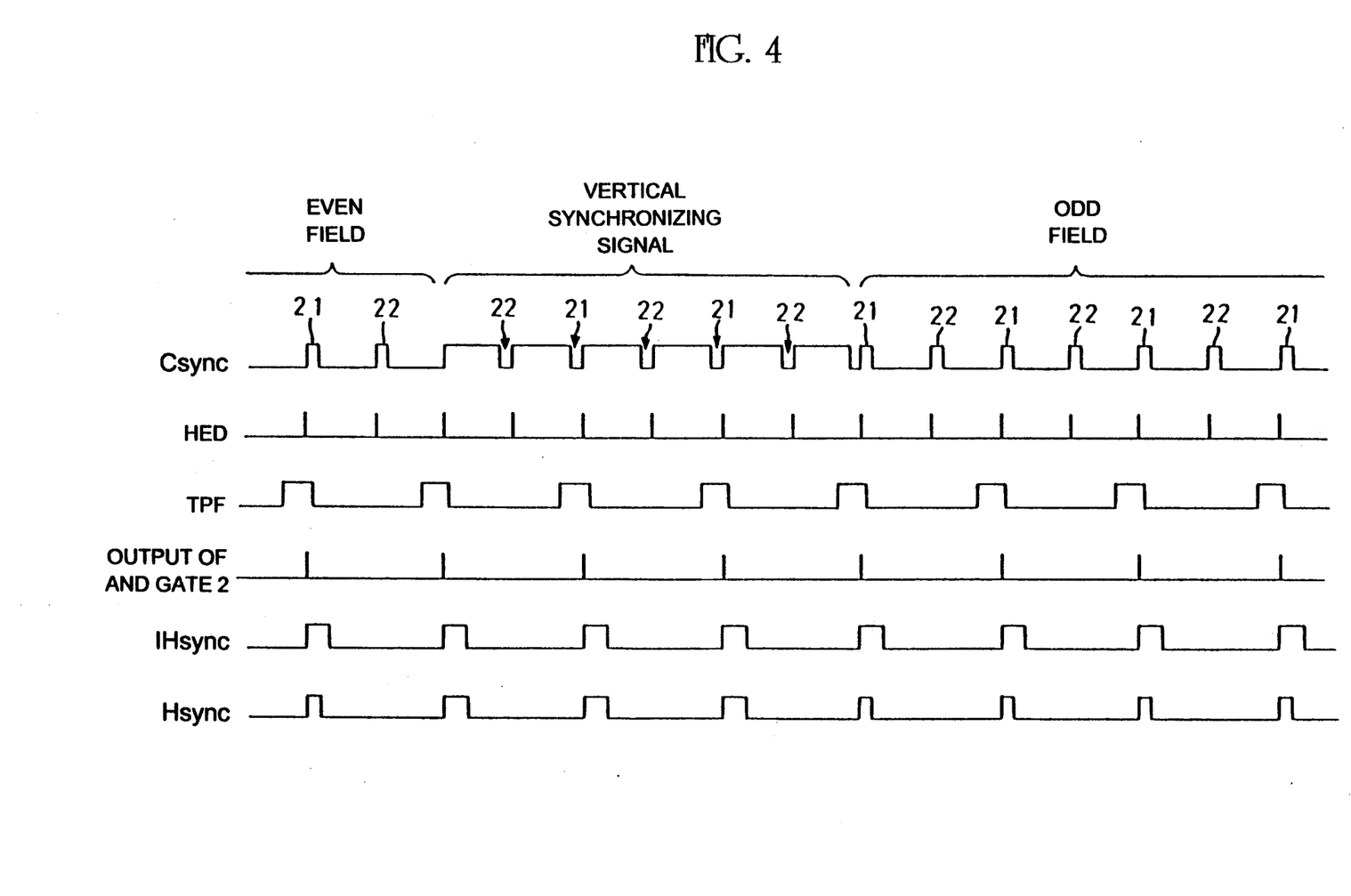

The operation of this embodiment will be described further with reference to FIG. 4. FIG. 4 shows signals at various portions in the horizontal synchronizing signal separation circuit of FIG. 1 in a transition from an even field to an odd field. In FIG. 4, it is assumed that the counter 3 in the horizontal synchronizing signal separation circuit is synchronized with the horizontal synchronizing pulse 21 in even fields. Accordingly, in an even field, the pulse signal HED corresponding to the equalizing pulse 22 does not pass through the AND gate 2. The pulse signal HED which has passed through the AND gate 2 clears the counter 3 so as to keep the synchronizing state between the counter 3 and the horizontal synchronizing pulse 21, and sets the RS flip-flop 6 so as to make the signal IH$_{sync}$ HIGH. The RS flip-flop 6 is reset by the timing signal t$_3$ output from the decoder 4 so that the signal IH$_{sync}$ becomes LOW. Since the composite synchronizing signal C$_{sync}$ passes through the AND gate 7 during the high level period of the signal IH$_{sync}$, the separated horizontal synchronizing signal H$_{sync}$ which is an output signal of the AND gate 7 is HIGH when both the signal IH$_{sync}$ and the composite synchronizing signal C$_{sync}$ are HIGH. As described above, only the horizontal synchronizing pulse 21 is separated from the composite synchronizing signal C$_{sync}$. The pulse width in the signal H$_{sync}$ corresponding to the horizontal synchronizing pulse 21 included in the vertical synchronizing signal is limited by the timing signal t$_3$.

Figure 5:
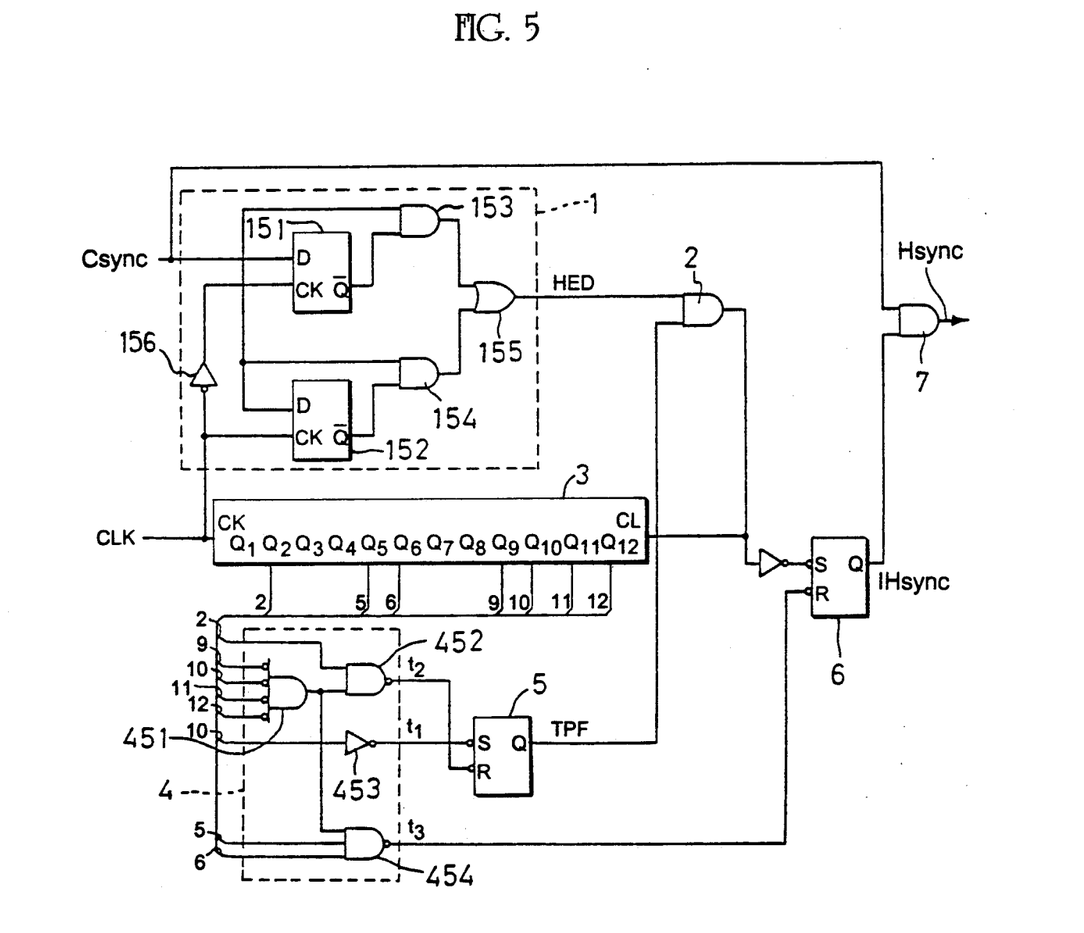
FIG. 5 is a circuit diagram illustrating the circuit of FIG. 1 in more detail.

FIG. 5 illustrates in more detail the embodiment of FIG. 1. The rising edge detection circuit 1 comprises two D-type flip-flop 151 and 152, two AND gates 153 and 154, an OR gate 155, and an inverter 156. The counter 3 is a 12-bit binary counter having outputs Q$_1$ to Q$_{12}$. The frequency of the clock signal CLK is preferably set to about 10 MHz. The decoder 4 comprises a four-input NOR gate 451, a NAND gate 452, an inverter 453, and a three-input NAND gate 454. The timing signal t$_1$ is obtained by converting the output Q$_{10}$ of the counter 3 at the inverter 453. The timing signal t$_2$ is obtained by the NOR gate 451 and NAND gate 452, and output when the outputs Q$_9$ to Q$_{12}$ of the counter 3 are LOW and the output Q$_2$ is HIGH. The timing signal t$_3$ is obtained by the NOR gate 451 and NAND gate 454, and output when the outputs Q$_9$ to Q$_{12}$ of the counter 3 are LOW and the outputs Q$_5$ and Q$_6$ are HIGH.

Figure 6:
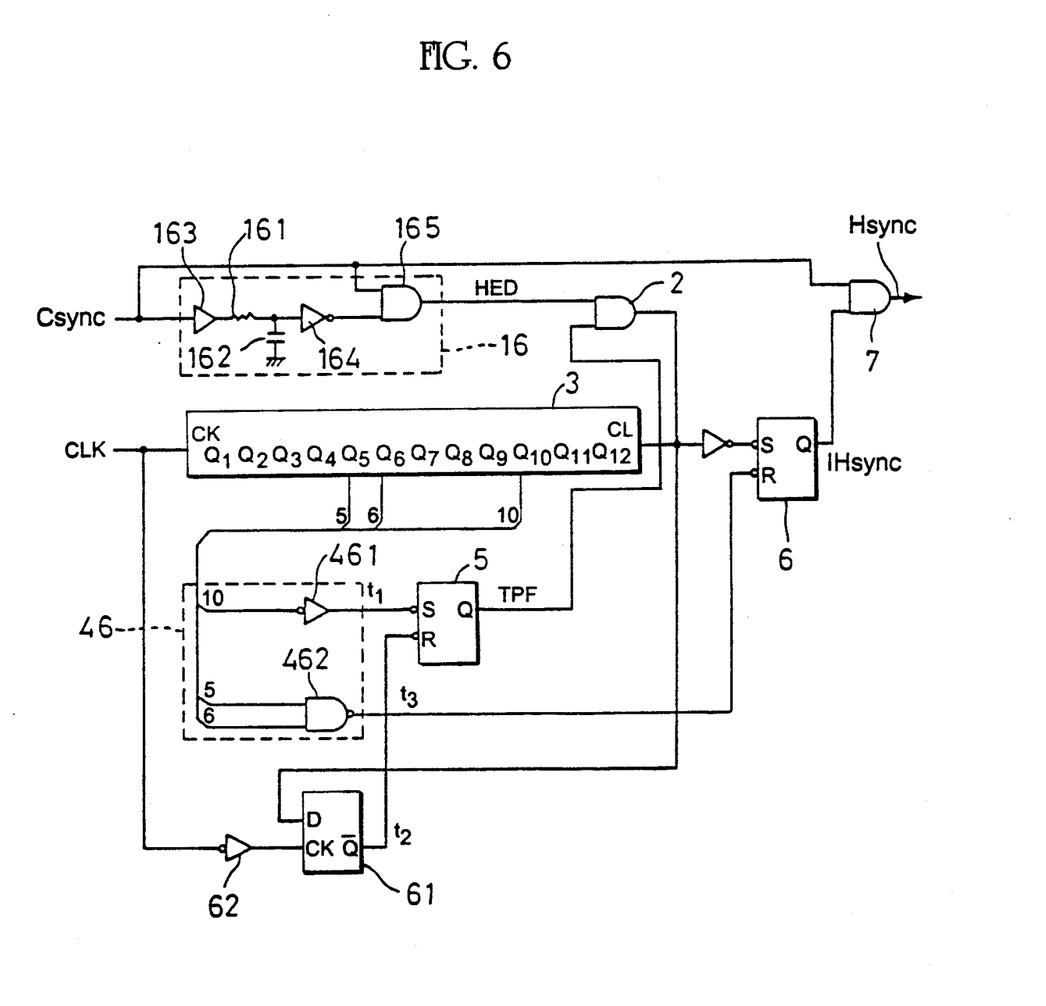
FIG. 6 is a circuit diagram illustrating a second embodiment of the invention.

FIG. 6 shows a second embodiment of the invention. In FIG. 6 and also in FIGS. 7–9 which will be described later, identical numerals are used for designating similar components as those of the horizontal synchronizing signal separation circuit of FIG. 1. In this embodiment, a rising edge detection circuit 16 comprises a buffer 163, a resistor 161, a capacitor 162, an inverter 164, and an AND gate 165. The rising edge detection circuit 16 utilizes the time constant of the CR circuit which consists of the resistor 161 and the capacitor 162 in order to detect the rising edge of the composite synchronizing signal C$_{sync}$. A decoder 46 comprises an inverter 461 and a NAND gate 462. The timing signals t$_1$ and t$_3$ are output from the inverter 461 and the NAND gate 462, respectively. The timing signal t$_2$ is not output from the decoder 46, but is generated by a D-type flip-flop 61 into which the output of an AND gate 2 is input through a terminal D. In this embodiment, the signal TPF which is a control signal of the AND gate 2 is generated by the combination of the decoder 46, an RS flip-flop 5 and the D-type flip-flop 61. The D-type flip-flop 61 prevents an unstable operation caused by the circuitry that the output of the AND gate 2 resets the RS flip-flop 5 which generates the signal TPF to be input into the AND gate 2. The clock signal CLK is supplied also to a clock terminal CK of the D-type flip-flop 61 through an inverter 62.

Figure 7:
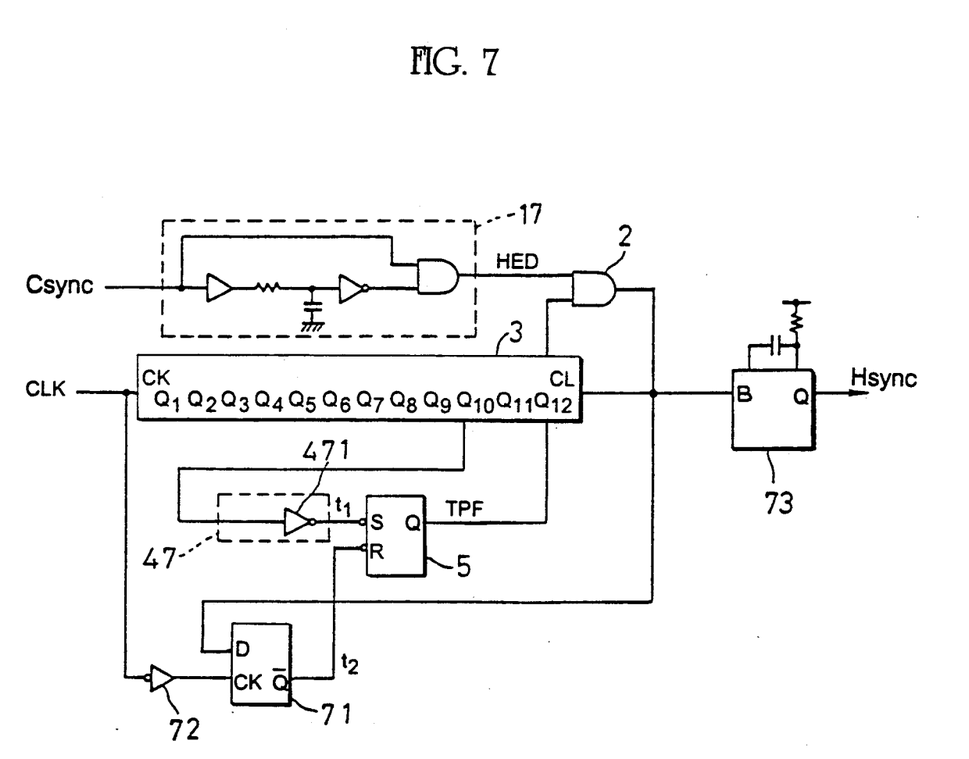
FIG. 7 is a circuit diagram illustrating a third embodiment of the invention.

FIG. 7 shows a third embodiment of the invention. A rising edge detection circuit 17 utilizes a time constant of a CR circuit in the same manner as in the second embodiment. A decoder 47 only comprises an inverter 471 for generating the timing signal t$_1$. In a similar manner as that in the second embodiment, the timing signal t$_2$ is generated by a D-type flip-flop 71 and an inverter 72 in accordance with the output of an AND gate 2. In this embodiment, a monostable multivibrator 73 is provided instead of the RS flip-flop 6 which is used in each of the above-described embodiments. The output of the monostable multivibrator 73 is the separated horizontal synchronizing signal H$_{sync}$. Thus, in this embodiment, only the rising edge of the horizontal synchronizing pulse 21 included in the composite synchronizing signal C$_{sync}$ is extracted as the signal HED which has passed through the AND gate 2, and the rising edge of the separated horizontal synchronizing signal H$_{sync}$ is determined by the signal HED. The pulse width of the signal H$_{sync}$ is fixed depending on the type of the monostable multivibrator 73. The use of the monostable multivibrator 73 eliminates the timing signal t$_3$.

Figure 8:
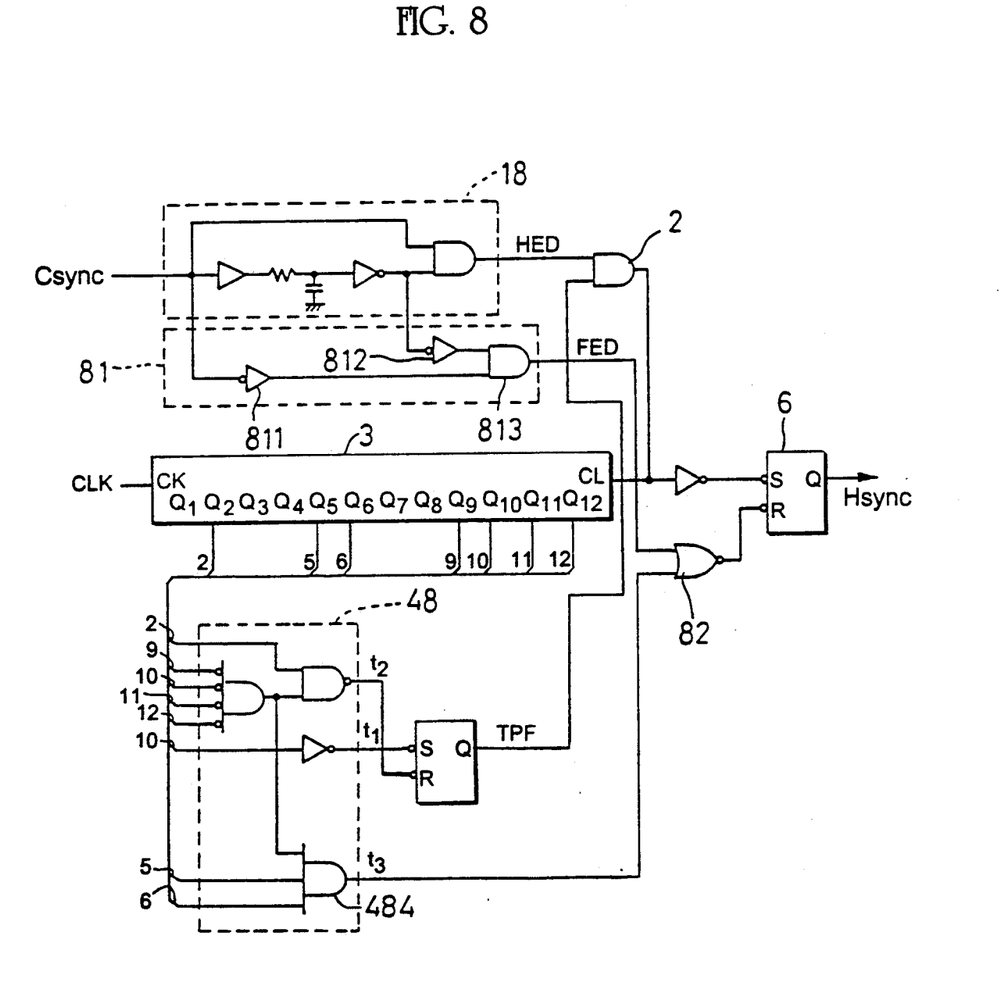
FIG. 8 is a circuit diagram illustrating a fourth embodiment of the invention.

FIG. 8 illustrates a fourth embodiment of the invention. In this embodiment, a falling edge detection circuit 81 is provided for detecting the falling edge of the composite synchronizing signal C$_{sync}$. The falling edge detection circuit 81 comprises inverters 811 and 812 and an AND gate 813, and utilizes a signal obtained from a rising edge detection circuit 18 in the detection of the falling edge of the composite synchronizing signal C$_{sync}$. The rising edge detection circuit 18 has the same configuration as that of the rising edge detection circuit 16 shown in FIG. 6. A signal FED output from the falling edge detection circuit 81 is supplied to a reset terminal R of the RS flip-flop 6 through a NOR gate 82. In this embodiment, the output of the RS flip-flop 6 is the separated horizontal synchronizing signal H$_{sync}$. The rising edge of the separated horizontal synchronizing signal H$_{sync}$ is indicated by the signal HED which has passed through an AND gate 2, and the falling edge of the signal H$_{sync}$ is indicated by the signal FED. Therefore, the pulse width of the signal H$_{sync}$ is substantially equal to the width of the horizontal synchronizing pulse in the composite synchronizing signal C$_{sync}$. The signal FED and the timing signal t$_3$ generated by a decoder 48 are input to the NOR gate 82. Accordingly, if the falling edge of the composite synchronizing signal C$_{sync}$ is detected by the falling edge detection circuit 81 after the timing signal t$_3$ is generated (such as in a period when the vertical synchronizing signal is input), the separated horizontal synchronizing signal H$_{sync}$ falls at the timing when the timing signal t$_3$ is generated. The decoder 48 has the same configuration as that of the decoder 4 shown in FIG. 5 except that the decoder 48 has an AND gate 484 in place of the NAND gate 454.

Figure 9:
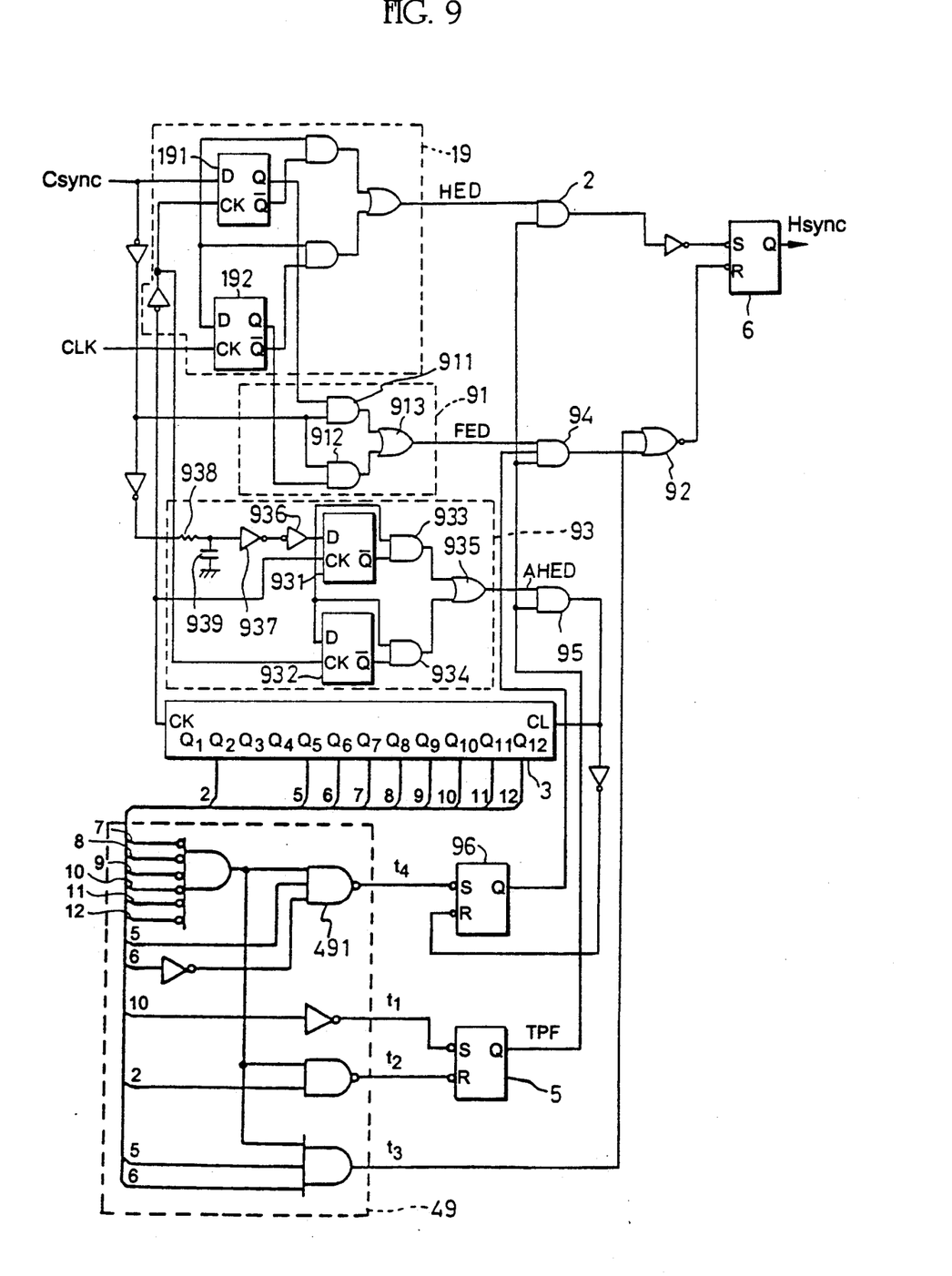
FIG. 9 is a circuit diagram illustrating a fifth embodiment of the invention.

FIG. 9 illustrates a fifth embodiment of the invention. The separation circuit of this embodiment has improved antinoise characteristics against noises mixed in the composite synchronizing signal C$_{sync}$. This embodiment comprises a rising edge detection circuit 19 having the same configuration as that of the rising edge detection circuit 1 shown in FIG. 5, and a falling edge detection circuit 91. The falling edge detection circuit 91 comprises AND gates 911 and 912 and an OR gate 913, and detects the falling edge of the composite synchronizing signal C$_{sync}$ using the outputs of two D-type flip-flops 191 and 192 in the rising edge detection circuit 19. The falling edge detection circuit 91 outputs the pulse signal FED, when detecting the falling edge of the composite synchronizing signal C$_{sync}$. The signal FED is input into a NOR gate 92 through an AND gate 94. The output of the NOR gate 92 is coupled to a reset terminal of the RS flip-flop 6 for generating a separated horizontal synchronizing signal H$_{sync}$.

In the embodiment of FIG. 9, another rising edge detection circuit 93 is provided so as to produce a pulse signal AHED for clearing the counter 3. The pulse signal AHED is fed to a clear terminal CL of the counter 3 via an AND gate 95. The rising edge detection circuit 93 comprises two D-type flip-flops 931 and 932, two AND gates 933 and 934, and an OR gate 935. The rising edge detection circuit 93 further comprises, on the input side of the D-type flip-flops 931 and 932, two inverters 936 and 937, and a CR circuit which consists of a resistor 938 and a capacitor 939 and functions as a low-pass filter. Accordingly, even if a pulse-like noise mixedly exists in the composite synchronizing signal C$_{sync}$, when the width of the pulselike noise is not so great, the noise cannot pass through the CR circuit. Therefore, the existence of such a noise does not affect the generation of the pulse signal AHED for clearing the counter 3. The provision of the rising edge detection circuit 93 greatly reduces the possibility that the counter 3 is erroneously cleared by the noise mixed in the composite synchronizing signal C$_{sync}$ to make the counter 3 and the horizontal synchronizing signal asynchronous with each other.

A decoder 49 used in the embodiment of FIG. 9 has a similar configuration to that of the decoder 4 shown in FIG. 5, except for a three-input NAND gate 491 which outputs a fourth timing signal t$_4$. The timing signal t$_4$ is generated when the output Q$_5$ of the counter 3 becomes HIGH for the first time after the counter 3 is cleared. The signal TPF output from the RS flip-flop 5 controlled by the timing signals t$_1$ and t$_2$ from the decoder 49 is fed to AND gates 94 and 95 as well as the AND gate 2. The timing signal t$_3$ is fed to the reset terminal R of the RS flip-flop 6 via the NOR gate 92 in a similar manner to that in the embodiment of FIG. 8.

An RS flip-flop 96 which is provided in the output side of the decoder 49 is set by the timing signal t$_4$ output from the decoder 49, and reset by the pulse signal AHED which has passed through the AND gate 95. The output of the RS flip-flop 96 is supplied to the AND gate 94, and the pulse signal FED output from the falling edge detection circuit 91 can pass the AND gate 94 when the output of the RS flip-flop 96 is HIGH. This prevents the pulse width of the separated horizontal synchronizing signal H$_{sync}$ corresponding to the horizontal synchronizing signal having a narrow pulse width in the periphery of the vertical synchronizing signal, from becoming narrower. By the existence of a pulse-like noise mixed in the composite synchronizing signal C$_{sync}$ during the high level period of the signal TPF, the signal AHED is not generated (namely, the counter 3 is not cleared). Therefore, such a noise is introduced into the separated horizontal synchronizing signal H$_{sync}$ while maintaining the original pulse width. Since such a noise generally has a narrow pulse width, even if the noise passes through the horizontal synchronizing signal separation circuit, the noise hardly affects the operation of a PLL circuit which uses the separated horizontal synchronizing signal H$_{sync}$ as an input signal.

As described above, the separation circuit of this embodiment has excellent superior antinoise characteristics. The separation circuit of this embodiment can supply a separated horizontal synchronizing signal H$_{sync}$ having pulses with a fixed width.

Figure 10:
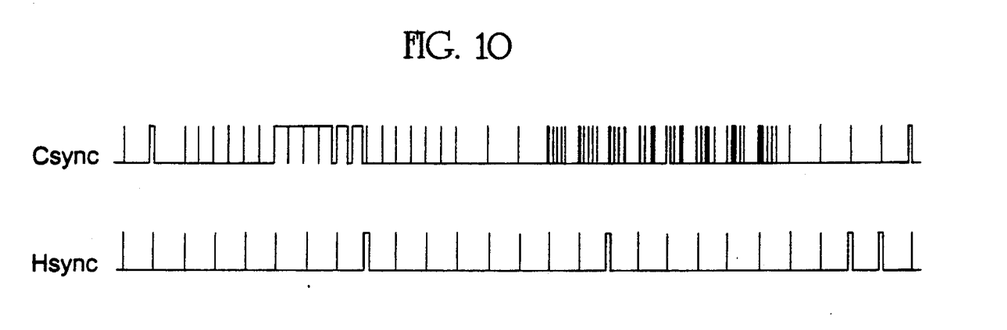
FIGS. 10 and 11 are timing charts each illustrating a horizontal synchronizing signal separated from a composite synchronizing signal.
Figure 11:
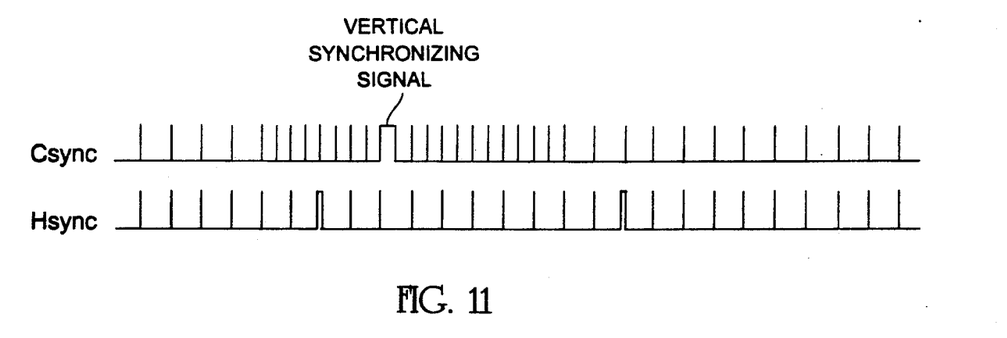

FIG. 10 shows a composite synchronizing signal C$_{sync}$ mixedly including a spurious synchronizing signal and the same as that shown in FIG. 14, and a separated horizontal synchronizing signal H$_{sync}$ obtained from the composite synchronizing signal C$_{sync}$ using the horizontal synchronizing signal separation circuit of FIG. 5. As seen from FIG. 10, according to the invention, the timing of a horizontal synchronizing signal can be correctly extracted, even from a composite synchronizing signal C$_{sync}$ transformed by a spurious synchronizing signal. FIG. 11 shows a composite synchronizing signal C$_{sync}$ obtained by reproducing a video tape which was subjected to such a duplication prevention process that a vertical synchronizing signal is extremely shortened, and a horizontal synchronizing signal H$_{sync}$ separated from this composite synchronizing signal C$_{sync}$. In the case of FIG. 11, the timing of the horizontal synchronizing signal in the composite synchronizing signal can be correctly extracted.

According to the invention, a horizontal synchronizing signal separation circuit is provided which can extract the timing of a horizontal synchronizing signal from a composite synchronizing signal. Using the timing extracted by the horizontal synchronizing signal separation circuit of the invention, a stable clock signal for sampling can be obtained in a matrix type display apparatus such as an LCD apparatus, and therefore stable and good display can be attained. Especially, in a specific reproduction of a video tape such as a rapid reproduction of a video tape which was subjected to a duplication prevention process, a remarkable effect can be attained. The output of the horizontal synchronizing signal separation circuit of this invention may be used as an input for PLL circuit which generates a clock signal for sampling in a matrix type display apparatus, thereby simplifying the design of such a PLL circuit.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A horizontal synchronizing signal separation circuit comprising:
    detection means for receiving a composite synchronizing signal which includes a horizontal synchronizing signal and a vertical synchronizing signal, and for generating a detection signal through an output, said detection signal being indicative of detecting a rising edge of said composite synchronizing signal;
    gate means, coupled to said output of said detection means, for receiving a control signal, and for passing said detection signal in accordance with said control signal;
    count means, coupled to said output of said detection means, for receiving a clock signal, and for counting the number of pulses in said received clock signal, the contents of said count means being cleared by said detection signal having passed through said gate means;

control signal generation means, coupled to the output of said count means, for generating said control signal in accordance with said output of said count means; and means, coupled to said output of said detection means, for generating a pulse which rises substantially at the timing when said detection signal passes through said gate means.

2. A horizontal synchronizing signal separation circuit according to claim 1, wherein said circuit further comprises another detection means for receiving said composite synchronizing signal, and for generating another detection signal indicative of detecting a falling edge of said composite synchronizing signal.

3. A horizontal synchronizing signal separation circuit comprising:

detection means for receiving a composite synchronizing signal which includes a horizontal synchronizing signal and a vertical synchronizing signal, and for generating a detection signal through an output, said detection signal being indicative of detecting a rising edge of said composite synchronizing signal;

gate means, coupled to said output of said detection means, for receiving a control signal, and for passing said detection signal in accordance with said control signal;

count means, coupled to said output of said detection means, for receiving a clock signal, and for counting the number of pulses in said received clock signal, the contents of said count means being cleared by said detection signal having passed through said gate means;

control signal generation means, coupled to the output of said count means and the output of said gate means, for generating said control signal in accordance with said output of said count means and said output of said gate means; and means, coupled to said output of said detection means, for generating a pulse which rises substantially at the timing when said detection signal passes through said gate means.

4. A horizontal synchronizing signal separation circuit comprising:

first detection means for receiving a composite synchronizing signal which includes a horizontal synchronizing signal and a vertical synchronizing signal, and for generating a first detection signal through an output, said first detection signal being indicative of detecting a rising edge of said composite synchronizing signal;

second detection means for receiving said composite synchronizing signal, and for generating a second detection signal through an output, said second detection signal being indicative of detecting a rising edge of said composite synchronizing signal;

first gate means, coupled to said output of said first detection means, for receiving a control signal, and for passing said first detection signal in accordance with said control signal;

second gate means, coupled to said output of said second detection means, for receiving said control signal, and for passing said second detection signal in accordance with said control signal;

count means for receiving a clock signal, and for counting the number of pulses in said received clock signal, the contents of said count means being cleared by said second detection signal having passed through said second gate means;

control signal generation means, coupled to the output of said count means, for generating said control signal in accordance with said output of said count means; and means, coupled to said output of said first detection means, for generating a pulse which rises substantially at the timing when said first detection signal passes through said gate means.

5. A horizontal synchronizing signal separation circuit according to claim 4, wherein said second detection means comprise a low-pass filter provided on the input side of said second detection means.

6. A horizontal synchronizing signal separation circuit according to claim 4, wherein said circuit further comprises a third detection means for receiving said composite synchronizing signal, and for generating a third detection signal indicative of detecting a falling edge of said composite synchronizing signal.

* * * * *